United States Patent
Sim et al.

(10) Patent No.: US 8,035,738 B2
(45) Date of Patent: Oct. 11, 2011

(54) APPARATUS AND METHOD OF CONTROLLING BLACK STRETCH

(75) Inventors: Yong-Hoon Sim, Seoul (KR); Do-Won Heo, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1092 days.

(21) Appl. No.: 11/838,526

(22) Filed: Aug. 14, 2007

(65) Prior Publication Data

US 2008/0043152 A1 Feb. 21, 2008

(30) Foreign Application Priority Data

Aug. 21, 2006 (KR) .................. 10-2006-0078562

(51) Int. Cl.
*H04N 5/16* (2006.01)

(52) U.S. Cl. ........ 348/379; 348/674; 348/673; 348/678; 348/672

(58) Field of Classification Search .......... 348/379, 348/674, 673, 678, 672, 687, 686, 671, 254, 348/255, 257; 382/168, 169, 274, 273, 275; 358/522, 447

See application file for complete search history.

(56) References Cited

U.S. PATENT DOCUMENTS 6,952,235 B2 * 10/2005 Park et al. ............ 348/379
7,292,734 B2 * 11/2007 Lee et al. ............ 382/274

FOREIGN PATENT DOCUMENTS

| JP | 60-125092 | 7/1985 |
| JP | 04-313989 | 11/1992 |
| JP | 2001-352552 | 12/2001 |
| JP | 2005-189388 | 7/2005 |
| KR | 1999-013354 | 2/1999 |
| KR | 1020010002871 | 1/2001 |
| KR | 1020030031289 | 4/2003 |

* cited by examiner

*Primary Examiner* — Michael Lee
*Assistant Examiner* — Jean W Desir
(74) *Attorney, Agent, or Firm* — F. Chau & Associates, LLC

(57) ABSTRACT

An apparatus for controlling black stretch includes a black stretching unit, an offset adjusting unit and an output unit. The black stretching unit performs black stretch processing on a video signal less than or equal to the maximum value of a black stretch control range in response to a slope of black stretch. The slope of black stretch corresponds to a region between a minimum value and a maximum value of the black stretch control range. The offset adjusting unit adjusts an offset of the black-stretched video signal. The output unit outputs an output video signal corresponding to the offset-adjusted video signal when the offset-adjusted video signal has a positive value in a region less than or equal to the minimum value, and outputs the output video signal corresponding to 0 when the offset-adjusted video signal has a negative value in the region less than or equal to the minimum value.

12 Claims, 4 Drawing Sheets

APPARATUS AND METHOD OF CONTROLLING BLACK STRETCH

CROSS-REFERENCE TO RELATED APPLICATIONS

This application claims priority under 35 USC §119 to Korean Patent Application No. 2006-78562, filed on Aug. 21, 2006, in the Korean Intellectual Property Office (KIPO), the disclosure of which is incorporated by reference herein in its entirety.

BACKGROUND OF THE INVENTION

1. Technical Field

The present disclosure relates to an apparatus and method of controlling black stretch, and more particularly to an apparatus and a method of controlling black stretch that enhances a contrast of a video signal when the video signal is adjusted by an offset.

2. Discussion of Related Art

A black stretch technique may be used to enhance a contrast of a video signal. The technique converts a portion of a low level video signal into a signal having a level that is lower than the low level signal, thereby enhancing the contrast between the low level signal and a high level signal. The technique analyzes a histogram of an input video signal, generates a black stretch function according to a distribution chart of the histogram, and applies the generated black stretch function to the input video signal.

FIG. 1 is a graph for describing a principle of a black stretch, and FIG. 2 is a graph for describing an offset adjustment with respect to FIG. 1. Referring to FIG. 1, black stretch may be controlled by calculating a black stretch control range, calculating a slope between a minimum value MIN and a maximum value TILT in the black stretch control range, performing black stretch processing on a video signal pertaining to the range between the minimum value MIN and the maximum value TILT in response to the slope SLOPE, and outputting 0 when the video signal has a value that is less than the minimum value.

However, as illustrated in FIG. 2, when an offset value is greater than 0, an overall output video signal is shifted in a positive direction on a Y-axis corresponding to the offset value. Therefore the contrast of the video signal is degraded because portions of the output video signal corresponding to an input video signal that are below the minimum value MIN have the offset value.

Thus, there is a need for a method and apparatus for controlling black stretch of a video signal that enhances the contrast of the video signal when the video signal is adjusted by an offset.

SUMMARY OF THE INVENTION

According to an exemplary embodiment of the present invention, an apparatus for controlling black stretch includes a black stretching unit, an offset adjusting unit and an output unit. The black stretching unit performs black stretch processing on a video signal in response to a slope of black stretch to generate a black-stretched video signal. The slope of black stretch corresponds to a region between a minimum value and a maximum value of a black stretch control range. The video signal that is less than or equal to the maximum value of the black stretch control range is black-stretched. The offset adjusting unit adjusts an offset of the black-stretched video signal. The output unit outputs an output video signal corresponding to the offset-adjusted video signal when the offset-adjusted video signal has a positive value in a region that is less than or equal to the minimum value, and outputs the output video signal corresponding to 0 when the offset-adjusted video signal has a negative value in the region that is less than or equal to the minimum value.

The minimum value may correspond a histogram accumulation value of the video signal that exceeds a reference value. The maximum value may correspond to a real tilt value that is determined between an initial tilt value and a mean value, where the initial tilt value is set in advance.

The output unit may include a sign determination unit configured to determine a sign of the offset-adjusted video signal, and a multiplexer configured to selectively output the offset-adjusted video signal or 0 in response to a result of the sign determination unit.

According to an exemplary embodiment of the present invention, a method for controlling black stretch includes performing black stretch processing on a video signal in response to a slope of black stretch to generate a black-stretched video signal, in which the slope of black stretch corresponds to a region between a minimum value and a maximum value of a black stretch control range and the video signal is less than or equal to the maximum value of the black stretch control range is black-stretched, adjusting an offset of the black-stretched video signal, and outputting an output video signal corresponding to the offset-adjusted video signal when the offset-adjusted video signal has a positive value in a region that is less than or equal to the minimum value and the output video signal corresponding to 0 when the offset-adjusted video signal has a negative value in the region that is less than or equal to the minimum value.

The minimum value may correspond a histogram accumulation value of the video signal that exceeds a reference value. The maximum value may correspond to a real tilt value determined between an initial tilt value and a mean value, where the initial tilt value is set in advance.

The outputting of the output video signal may include determining a sign of the offset-adjusted video signal and selectively outputting the offset-adjusted video signal or 0 based on the sign.

DETAILED DESCRIPTION OF EXEMPLARY EMBODIMENTS

Figure 1:
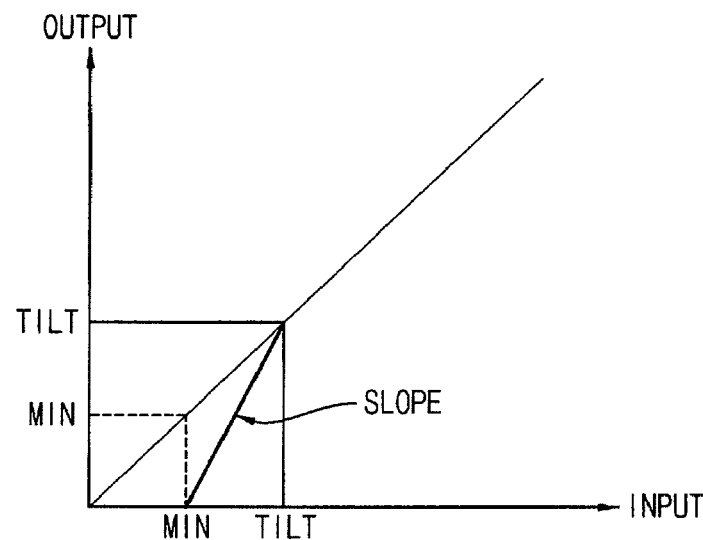
FIG. 1 is a graph for describing a principle of a black stretch.
Figure 2:
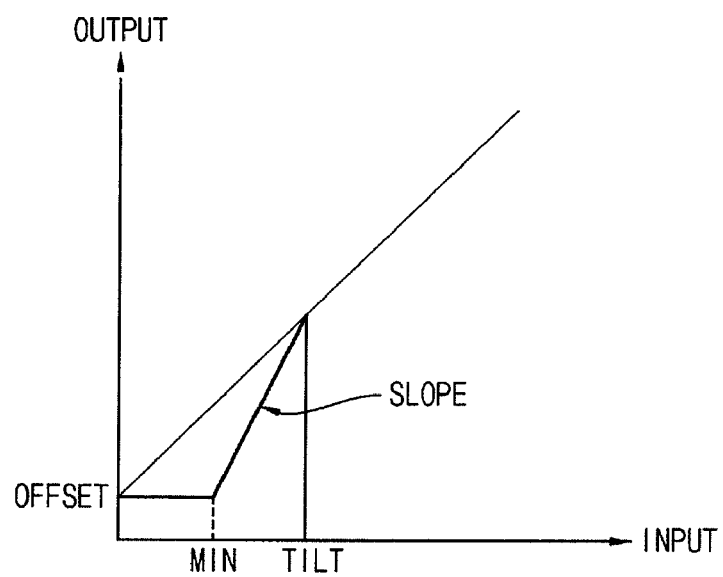
FIG. 2 is a graph for describing an offset adjustment with respect to FIG. 1.

Exemplary embodiments of the present invention will now be described more fully with reference to the accompanying drawings. The invention may, however, be embodied in many different forms and should not be construed as limited to the exemplary embodiments set forth herein. Like reference numerals refer to like elements throughout the specification.

It will be understood that when an element is referred to as being "connected" or "coupled" to another element, it can be directly connected or coupled to the other element or intervening elements may be present.

It is to be understood that the apparatuses and methods described herein may be implemented in various forms of hardware, software, firmware, special purpose processors, or a combination thereof. In particular, a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent apparatus components and process steps depicted in the accompanying figures may be implemented in software, the connections between apparatus modules (or the logic flow of method steps) may differ depending upon the manner in which the present invention is programmed.

Figure 3:
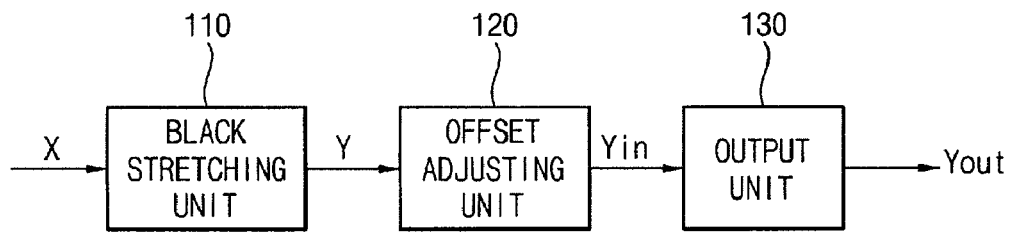
FIG. 3 is a block diagram illustrating an apparatus for controlling black stretch according to an exemplary embodiment of the present invention.

FIG. 3 is a block diagram illustrating an apparatus for controlling black stretch according to an exemplary embodiment of the present invention. Referring to FIG. 3, the apparatus includes a black stretching unit 110, an offset adjusting unit 120, and an output unit 130. The black stretching unit 110 performs black stretch processing on a video signal in units of fields or frames in response to a slope of black stretch corresponding to a range between a minimum value and a maximum value of a black stretch control range. Portions of the video signal that are less than or equal to the maximum value of the black stretch control range are black-stretched.

Figure 4:
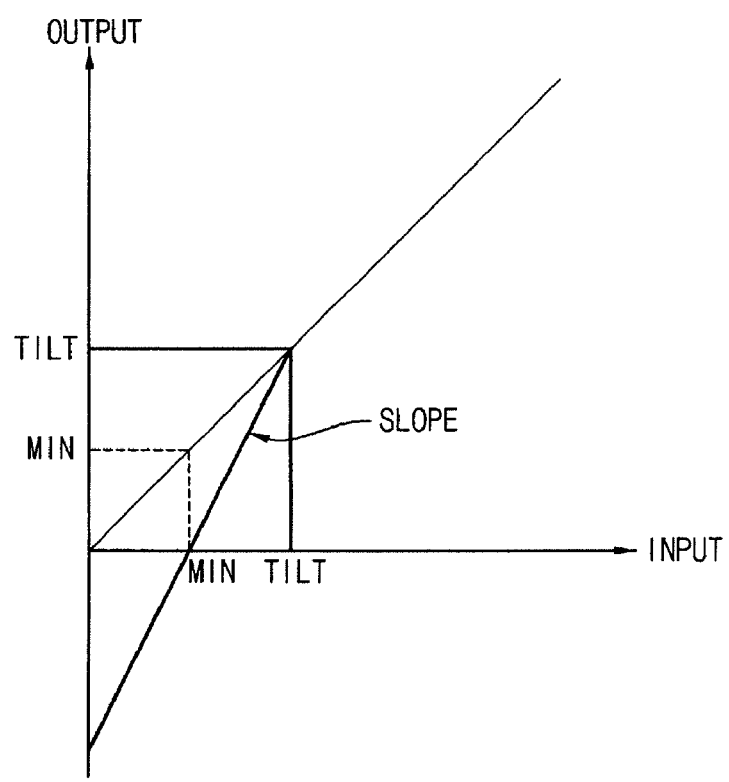
FIG. 4 is a graph illustrating input/output characteristics of the black stretching unit in FIG. 3.

FIG. 4 is a graph illustrating input/output characteristics of the black stretching unit in FIG. 3. Referring to FIG. 4, the black stretching unit 110 performs black stretch processing on portions of a video signal that are less than or equal to a maximum value.

The following equation 1 is an input/output equation of a black stretch control range.

$$Y = AX + B \quad (1)$$

Referring to equation 1, X is an input video signal, Y is a black-stretched video signal, A is a slope (=TILT/(TILT−MIN)) and B is an intercept (=−(MIN×TILT)/(TILT−MIN)).

The minimum value MIN is a histogram accumulation value of the video signal that exceeds a reference value. The maximum value corresponds to a real tilt value TILT_REAL that is determined between an initial tilt value TILT_INT and a mean value MEAN, where the initial tilt value TILT_INT is set in advance.

The input video signal X is output as the black-stretched video signal Y by using equation 1. When the input video signal X is less than or equal to the minimum value MIN, the black-stretched video signal Y is set to a value that is less than or equal to 0.

The offset adjusting unit 120 receives the black-stretched video signal Y and shifts the black-stretched video signal to an offset value in a direction of a Y-axis. When the offset value is greater than 0, the black-stretched video signal Y is shifted in a positive direction on the Y-axis, and when the offset value is less than 0, the black-stretched video signal Y is shifted in a negative direction on the Y-axis.

Figure 5:
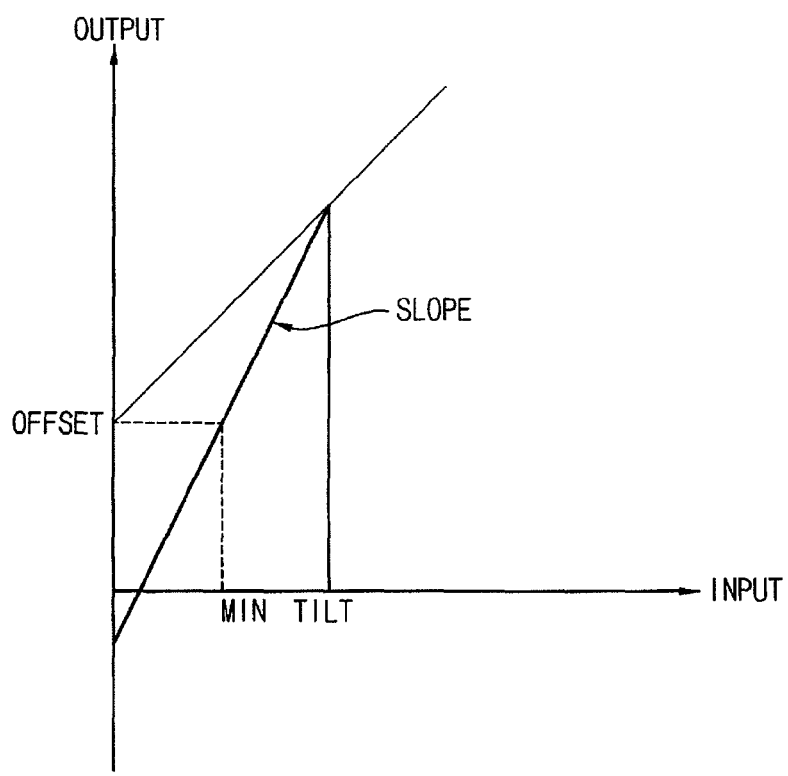
FIG. 5 is a graph illustrating input/output characteristics of the offset adjusting unit in FIG. 3.

FIG. 5 is a graph illustrating input/output characteristics of the offset adjusting unit in FIG. 3. Referring to FIG. 5, the offset value is the crossing point of the Y-axis and a line whose gain is 1. A black-stretched video signal based on the minimum value MIN is shifted to the offset value. Therefore, a portion of the offset-adjusted video signal corresponding to the input video signal that is less than the minimum value MIN is greater than 0.

Figure 6:
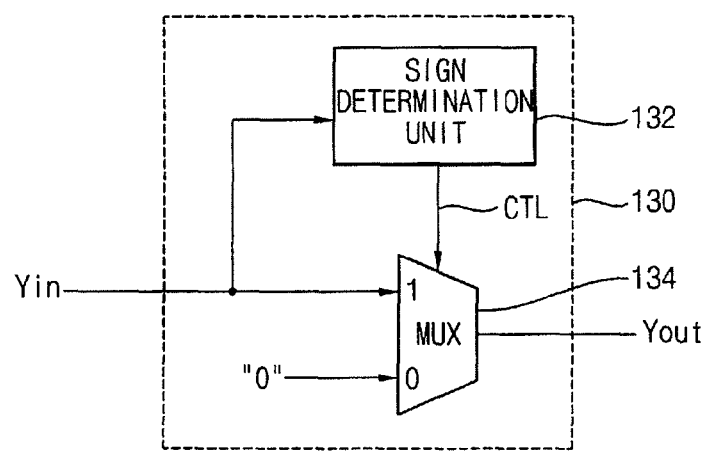
FIG. 6 is a block diagram illustrating an embodiment of the output unit in FIG. 3

FIG. 6 is a block diagram illustrating an embodiment of the output unit in FIG. 3 Referring to FIG. 6, the output unit 130 includes a sign determination unit 132 and a multiplexer 134.

The sign determination unit 132 determines a sign of the offset-adjusted video signal Yin. When the offset-adjusted video signal is greater than 0, the sign determination unit 132 outputs a high level signal "1". When the offset-adjusted video signal is less than 0, the sign determination unit 132 outputs a low level signal "0". The multiplexer 134 selects the offset-adjusted video signal or 0 in response to a level of an output signal CTL of the sign determination unit 132. For example, when the output signal CTL of the sign determination unit 132 is a high level signal, the multiplexer 134 selects the offset-adjusted video signal, and when the output signal CTL of the sign determination unit 132 is a low level signal, the multiplexer 134 selects 0.

When the offset value is greater than 0, the apparatus for controlling black stretch may enhance contrast of a video signal because the output unit 130 may output an output video signal Yout that is differently stretched below the minimum value MIN of the input video signal Yin. When the input video signal Yin is less than the minimum value MIN and the offset-adjusted video signal is less than 0, the output video signal Yout is 0.

When the offset value is less than or equal to 0, the output unit 130 determines a sign of the offset-adjusted video signal. When the offset-adjusted video signal is less than 0, the output unit 130 outputs the output video signal Yout as 0. When the offset-adjusted video signal is greater than 0, the output unit 130 outputs the output video signal Yout as the offset-adjusted video signal. When the offset value is 0, the output video signal Yout corresponding to the input signal Yin that is less than the minimum MIN is 0.

An embodiment of the apparatus for controlling black stretch may enhance contrast when the offset value is greater than 0 even though the input video signal is less than the minimum value MIN.

Figure 7:
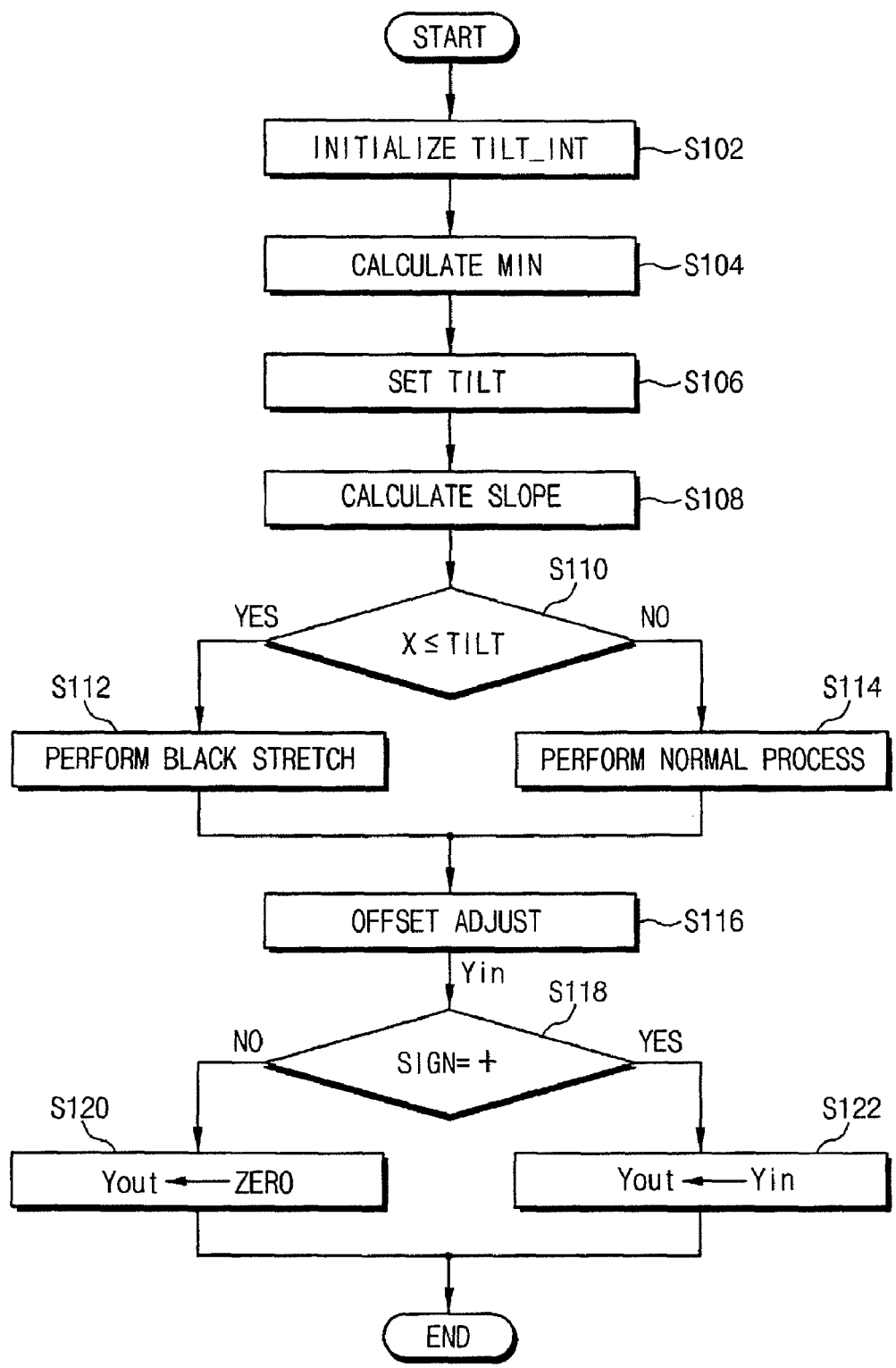
FIG. 7 is a flow chart illustrating a method of controlling black stretch according to an exemplary embodiment of the present invention.

FIG. 7 is a flow chart illustrating a method of controlling black stretch according to an exemplary embodiment of the present invention. Referring to FIG. 7, an initial tilt value TILT_INT is initialized to a predetermined value (step S102).

Next, a minimum value MIN is calculated (step S104). The minimum value is set to a histogram accumulation value of the video signal that exceeds a reference value so that a distribution characteristic of the input video signal may be sufficiently expanded.

Next, a maximum value TILT is set (step S106). A real tilt value TILT_REAL may be calculated by comparing a mean value MEAN with the initial tilt value TILT_INT. When the mean value MEAN is greater than the initial tilt value TILT_INT, the initial tilt value TILT_INT is set as the real tilt value TILT_REAL, and when the mean value MEAN is less than the initial tilt value TILT_INT, the mean value MEAN is set as the real tilt value TILT_REAL. The calculated real tilt value TILT_REAL is provided as the maximum value TILT.

After the minimum value MIN and maximum value TILT are calculated or set, a slope SLOPE in a black stretch control range is calculated (step S108). Next, when an input video signal X is not greater than the maximum value TILT (step S110: YES), the input video signal X is black stretched (step S112) in response to a stretch characteristic in the black stretch control range obtained by Equation 1. When the input video signal X is greater than the maximum value TILT (step S110: NO), the input video signal X is normally processed (step S114).

The processed video signal is adjusted by an offset value that is input by a user (step S116). The offset-adjusted video signal Yin is provided to the output unit 130. Next, a sign of the offset-adjusted video signal Yin is determined (step S118). When the sign of the offset-adjusted video signal Yin is positive (step S118: YES), an output video signal Yout is the offset-adjusted video signal (step S122). When the sign of the offset-adjusted video signal Yin is negative (step S118: NO), the output video signal Yout is 0 (step S120).

When an offset value is increased after an input video signal is black-stretched, an output video signal corresponding to the input video signal that is less than a minimum value has an offset value, thereby degrading contrast. An apparatus for controlling black stretch according to an exemplary embodiment of the present invention may be used to improve the contrast. The apparatus outputs an offset-adjusted video signal when the offset-adjusted video signal has a positive value in a region less than a minimum value, and outputs 0 when the offset-adjusted video signal has a negative value in the region less than the minimum value. The apparatus may adaptively improve the contrast and image quality of an input video signal with an offset adjusting even though the input video signal is less than the minimum value MIN.

While exemplary embodiments of the present invention have been described in detail, it is to be understood that various changes, substitutions and alterations may be made herein without departing from the scope of the invention

What is claimed is:

1. An apparatus for controlling black stretch, comprising:
 a black stretching unit configured to perform black stretch processing on a video signal in response to a slope of black stretch to generate a black stretched video signal, the slope of black stretch corresponding to a region between a minimum value and a maximum value of a black stretch control range, wherein the video signal is less than or equal to the maximum value of the black stretch control range being black-stretched;
 an offset adjusting unit configured to adjust an offset of the black-stretched video signal to generate an offset-adjusted video signal; and
 an output unit configured to output an output video signal corresponding to the offset-adjusted video signal when the offset-adjusted video signal has a positive value in a region that is less than or equal to the minimum value, and configured to output the output video signal corresponding to 0 when the offset-adjusted video signal has a negative value in the region that is less than or equal to the minimum value.

2. The apparatus of claim 1, wherein the minimum value corresponds to a histogram accumulation value of the video signal that exceeds a reference value.

3. The apparatus of claim 1, wherein the maximum value corresponds to a real tilt value that is determined between an initial tilt value and a mean value, wherein the initial tilt value is set in advance.

4. The apparatus of claim 1, wherein the output unit comprises:
 a sign determination unit configured to determine a sign of the offset-adjusted video signal; and
 a multiplexer configured to selectively output one of the offset-adjusted video signal and 0 in response to a result of the sign determination unit.

5. A method of controlling black stretch, comprising:
 performing black stretch processing on a video signal in response to a slope of black stretch to generate a black-stretched video signal, the slope of black stretch corresponding to a region between a minimum value and a maximum value of a black stretch control range, wherein the video signal is less than or equal to the maximum value of the black stretch control range being black-stretched;
 adjusting an offset of the black-stretched video signal to generate an offset-adjusted video signal; and
 outputting an output video signal corresponding to the offset-adjusted video signal when the offset-adjusted video signal has a positive value in a region that is less than or equal to the minimum value and the output video signal corresponding to 0 when the offset-adjusted video signal has a negative value in the region that is less than or equal to the minimum value.

6. The method of claim 5, wherein the minimum value corresponds to a histogram accumulation value of the video signal that exceeds a reference value.

7. The method of claim 5, wherein the maximum value corresponds to a real tilt value that is determined between an initial tilt value and a mean value, wherein the initial tilt value is set in advance.

8. The method of claim 5, wherein the outputting the output video signal comprises:
 determining a sign of the offset-adjusted video signal; and
 selectively outputting the offset-adjusted video signal or 0 based on the sign.

9. A computer readable medium embodying instructions executable on a processor to perform method steps for controlling black stretch, the method steps comprising:
 performing black stretch processing on a video signal in response to a slope of black stretch to generate a black-stretched video signal, the slope of black stretch corresponding to a region between a minimum value and a maximum value of a black stretch control range, wherein the video signal is less than or equal to the maximum value of the black stretch control range being black-stretched;
 adjusting an offset of the black-stretched video signal to generate an offset-adjusted video signal; and
 outputting an output video signal corresponding to the offset-adjusted video signal when the offset-adjusted video signal has a positive value in a region that is less than or equal to the minimum value and the output video signal corresponding to 0 when the offset-adjusted video signal has a negative value in the region that is less than or equal to the minimum value.

10. The computer readable medium of claim 9, wherein the minimum value corresponds to a histogram accumulation value of the video signal that exceeds a reference value.

11. The computer readable medium of claim 9, wherein the maximum value corresponds to a real tilt value that is determined between an initial tilt value and a mean value, wherein the initial tilt value is set in advance.

12. The computer readable medium of claim 9, wherein the outputting the output video signal comprises:
 determining a sign of the offset-adjusted video signal; and
 selectively outputting the offset-adjusted video signal or 0 based on the sign.

* * * * *